United States Patent [19]

Fiorda

[11] Patent Number: 4,996,544

[45] Date of Patent: Feb. 26, 1991

[54] AUTOWINDER FOR UNDERWATER AND ALL WEATHER CAMERA

[76] Inventor: John H. Fiorda, 3074 Van Buren Ave., Costa Mesa, Calif. 92626

[21] Appl. No.: 463,520

[22] Filed: Jan. 11, 1990

[51] Int. Cl.⁵ .............................................. G03B 1/18

[52] U.S. Cl. .................................. 354/64; 354/173.1; 354/266

[58] Field of Search .............. 354/64, 170, 171, 173.1, 354/206, 213, 266, 295

[56] References Cited

U.S. PATENT DOCUMENTS 2,944,474 7/1960 Dennis ................................ 354/64

4,025,930 5/1977 Wolff .................................. 354/64

*Primary Examiner*—Brian W. Brown

*Assistant Examiner*—Howard B. Blankenship

*Attorney, Agent, or Firm*—Roy A. Ekstrand

[57] ABSTRACT

An autowinder for use with all weather or underwater cameras includes a sealed generally U-shaped housing having a threaded attachment to a camera body. An internal power source and bidirectional motor are supported within the housing and operatively coupled to the film advance mechanism of the camera by a drive belt system. A generally L-shaped lever is pivotally supported upon the autowinder body exterior and is operated in response to a trigger to actuate the shutter mechanism of the camera. A magnet is supported upon the L-shaped trigger arm and actuates the autowinder function within the housing. Magnetic limit switches are operative to control the direction and extent of motor operation to provide appropriate autowinding action.

10 Claims, 2 Drawing Sheets

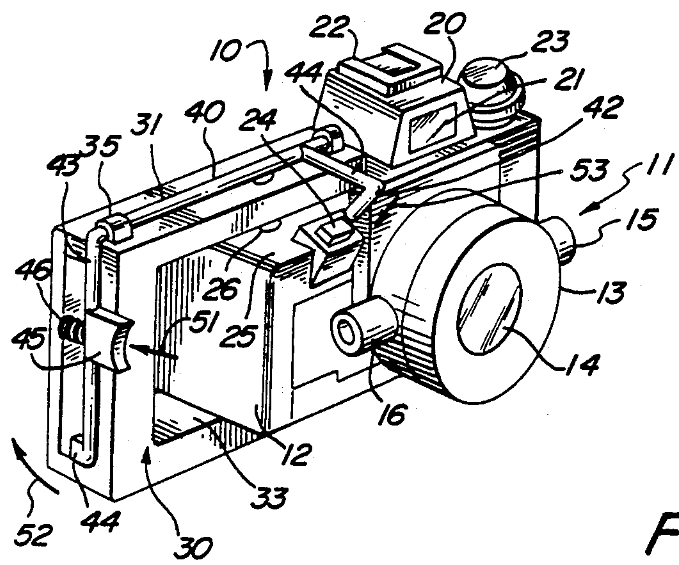
FIG. 1
FIG. 2
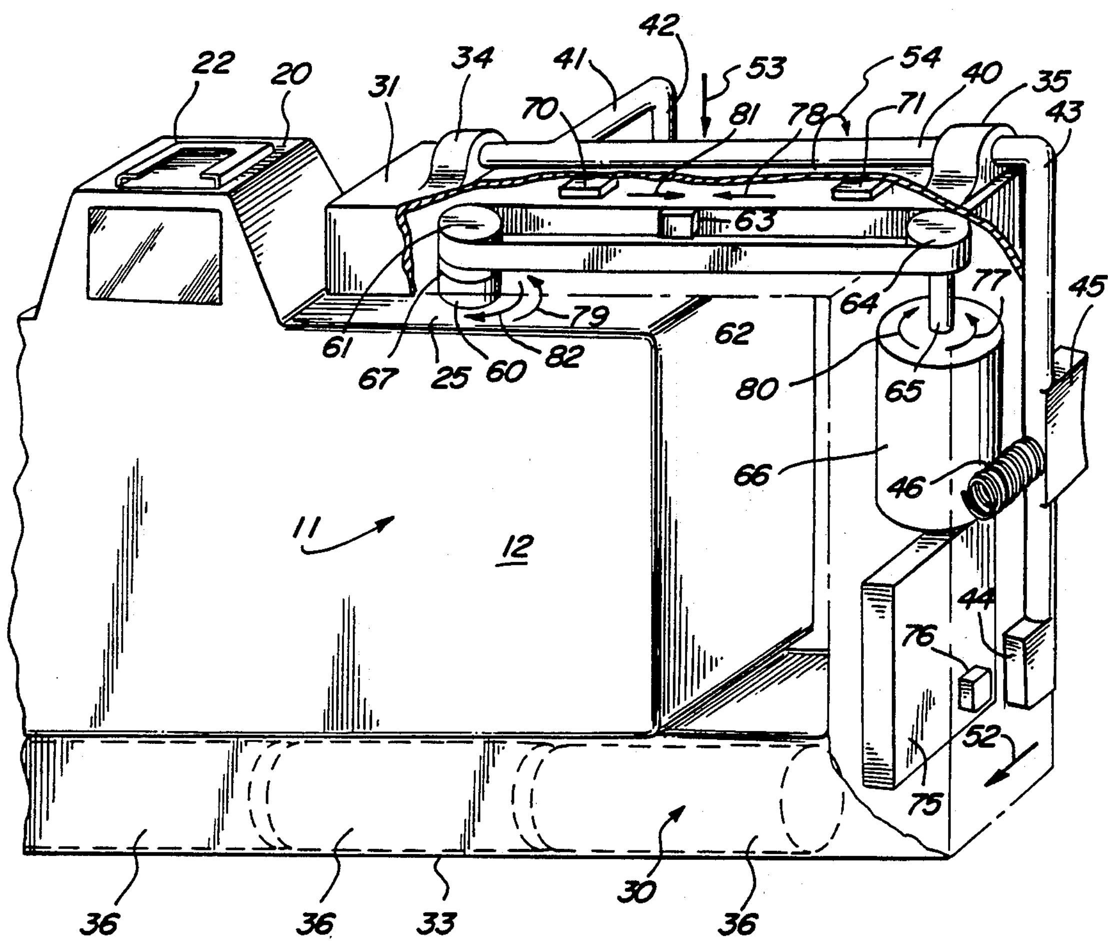

AUTOWINDER FOR UNDERWATER AND ALL WEATHER CAMERA

FIELD OF THE INVENTION

This invention relates generally to underwater and all weather cameras and particularly to film advance mechanisms used therein.

BACKGROUND OF THE INVENTION

In a wide variety of camera environments and uses it is desirable to employ a camera which is sealed or watertight. Perhaps the most popular type of sealed or watertight camera is that generally referred to as underwater cameras. In a sense, however, the term underwater cameras is a misnomer in that while a substantial number of such cameras are used in underwater environments, a significant number are used as all weather cameras in applications or environments in which the cameras are subjected to rain, salt spray or other potentially damaging environments.

In any event while the design of underwater cameras varies somewhat, all generally comprise a unitary sealed body having a film magazine and film transport and advance mechanism enclosed therein. A lens generally comprising a cylindrical shaped member is sealingly secured to the camera body in front of the shutter mechanism. Several user operative controls are coupled to the lens and camera body to provide operation by the user. For example, the lens generally supports rotatable knobs or similar controls operative to provide aperture setting and focus of the lens. Similarly, the camera body supports a film advance lever or winder together with a shutter release mechanism. The latter generally comprises a depressible button positioned on the camera body. To provide successful underwater operation, the entire camera body lens and various controls must in total provide a sealed watertight configuration which protects the film and internal mechanisms of the camera.

In many situations such as those encountered by swimmers and divers, the camera must be operated using divers or swimmers gloves which often render the manipulation of the camera controls difficult. For example, the film advance lever is usually operated by the photographer's thumb in a simple slide motion along the backside of the camera body. However, the presence of gloves renders substantial difficulty in feeling or detecting the proper motion of the advance lever. Similarly, the shutter release button is generally a light touch button and determination of proper operation through gloves is also frequently difficult. In general, the limitation on tactile feedback due to gloves used by an underwater swimmer renders the entire operation of the camera less than comfortable or satisfactory.

In addition to the operational difficulties associated with underwater or all weather cameras, accessories utilized with such cameras are similarly subject to leakage problems. In addition, certain accessories can in fact increase the likelihood of leakage or other damage to the camera. Since many underwater cameras are operated in the ocean as opposed to fresh water bodies, additional problems arise in connection with the camera's moving parts due to the corrosion and salt build up caused by salt water. All of the foregoing combine to render the addition of accessories or enhancements to underwater cameras to be a difficult and demanding task.

One of the most severely felt needs in the underwater camera art is that of providing an acceptable autowinding mechanism which may readily be used in conjunction with a conventional underwater camera.

SUMMARY OF THE INVENTION

Accordingly, it is a general object of the present invention to provide an improved operation for underwater cameras. It is a more particular object of the present invention to provide an autowinder suitable for use in combination with underwater or all weather cameras. It is still a more particular object of the present invention to provide an improved autowinder for underwater or all weather cameras which maintains the sealed integrity of the underwater camera body.

In accordance with the present invention, there is provided for use in combination with a camera having a film advance mechanism and shutter release, an autowinder comprising a sealed housing having an interior cavity and exterior; a trigger arm pivotally coupled to the housing having a first end proximate the shutter release of the camera and a second end; a magnet secured to the second end; a bidirectional motor within the housing; circuit means within the housing operatively coupled to the motor having magnetic sensing means responsive to the magnet to initiate energizing of the motor in a first direction; drive means coupling the motor to the film advance mechanism of the camera; and limit means cooperating with the circuit means to cause operation of the film advance mechanism of the camera through a normal cycle once motor operation is initiated.

BRIEF DESCRIPTION OF THE DRAWINGS

The features of the present invention, which are believed to be novel, are set forth with particularly in the appended claims. The invention, together with further objects and advantages thereof, may best be understood by reference to the following description taken in conjunction with the accompanying drawings, in the several figures of which like reference numerals identify like elements and in which:

FIG. 1 sets forth a perspective view an autowinder constructed in accordance with the present invention secured to a typical underwater or all weather camera;

FIG. 2 sets forth a partially sectioned view of the present invention autowinder for underwater or all weather camera;

DESCRIPTION OF THE PREFERRED EMBODIMENT

Figure 3:
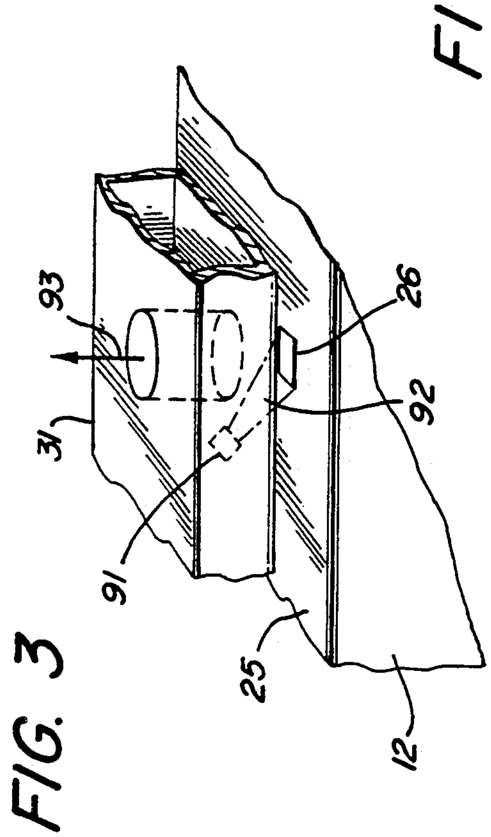
FIG. 3 sets forth a partial section view of a portion of the present invention autowinder which facilitates viewing the exposure counter of a typical underwater or all weather camera.

FIG. 1 sets forth a perspective view of an autowinder constructed in accordance with the present invention and generally referenced by numeral 10 supported upon a typical underwater camera generally referenced by numeral 11.

Camera 11 is a typical underwater or all weather camera having a camera body 12 forming a generally rectangular sealed housing and supporting a generally cylindrical lens 13 extending outwardly therefrom.

Lens 13 supports a front lens element 14 and a focus adjustment knob 15 and aperture adjustment 16. Camera 11 further includes a generally rectangular view finder 20 having a viewing lens 21 supported therein. A flash plate 22 constructed in accordance with conventional fabrication techniques is supported upon view finder 20. A rewind mechanism 23 constructed in accordance with conventional techniques is supported upon camera body 12. Camera 11 further includes a depressible shutter release button 24 and an exposure counter indicator window 26. Window 26 is positioned to be readily viewed by the user of camera 11.

Autowinder 10 includes a generally U-shaped sealed housing 30 having a handle portion 32, an upper portion 31, and a lower portion 33. Lower portion 33 extends along the lower side of camera body 12 and is secured thereto in a threaded attachment using the standard tripod mounting aperture of camera body 12 (not shown). Upper portion 31 of housing 30 further includes a pair of pivotal attachments 34 and 35 and a transparent viewer 50. An arm 40 having a generally circular cross section extends laterally across the top of upper portion 31 and is supported at one end by pivot 34 and at the other end by pivot 35. A shutter link arm 41 extends outwardly from arm 40 in a generally perpendicular relationship and terminates in an angularly positioned shutter actuator arm 42. In accordance with an important aspect of the present invention, shutter actuator 42 is positioned directly in line with shutter release button 24. A trigger arm 43 is coupled to arm 40 in a perpendicular relationship and extends downwardly alongside handle portion 32 of housing 30. A trigger button 45 is secured to trigger arm 43 and a coil spring 46 is coupled between trigger arm 43 and handle 32. Spring 46 is compressively captivated between trigger button 45 and handle portion 32 and, as a result, resists the motion of trigger 45 in the direction indicated by arrow 52. A magnet 44 is supported at the lower end of trigger arm 43 in close proximity to the outer surface of handle portion 32 of housing 30.

In the position shown in FIG. 1, trigger 45 is biased forward by spring 46 and, as a result, shutter actuator arm 42 is removed from shutter release 24. Concurrently, the position shown in FIG. 1 places magnet 44 alongside the forward portion of handle 32. During use, the photographer grips handle 32 and depresses trigger 45 when a picture is to be taken. The depression of trigger 45 overcomes spring 46 and pivots trigger arm 43 about pivot 35 in the direction indicated by arrow 52. The rotation of trigger arm 43 about pivot 35 is communicated to shutter link arm 41 by arm 40 which in turn causes shutter actuator arm 42 to move downwardly against shutter release button 24 in the direction indicated by arrow 53. As trigger 45 continues to be pressed inwardly in the direction indicated by arrow 51, the downward motion of shutter actuator arm 42 in the direction of arrow 53 continues and shutter release button 24 is actuated. Thereafter in accordance with the conventional operation of camera 11, the shutter mechanism within the camera (not shown) exposes a film frame through lens 13 and thereafter closes the shutter mechanism. In the normal operation of camera 11 without the use of autowinder 10, the operator would then advance a film advance lever (not shown) to transport the next film frame to the shutter exposure portion of the camera and to reset the shutter mechanism. In accordance with the present invention, however, and by means set forth below in greater detail, the actuation of trigger 45 in addition to operating shutter release 24 passes magnet 44 in close proximity to a sensing switch within housing 32 (seen in FIG. 2). The operation of the sensing mechanism within handle 32 commences a sequence of operations set forth below in greater detail. However, suffice it to note here that the present invention autowinder is operative to rotate the film advance mechanism and transport the next film frame in the manner normally provided by the operator's manipulation of the advance lever. Thus, autowinder 10 operates by means set forth below to automatically wind the film within camera 11 to the next exposure each time trigger 45 is actuated.

In accordance with an important aspect of the present invention, it should be noted that arm 40, trigger arm 43, trigger 45, magnet 44, shutter link arm 41 and shutter actuator arm 42 together with pivots 34 and 35 are entirely external to housing 30 and camera body 12. As a result, the foregoing components may be easily claimed following each exposure to a salt water or other potentially corrosive environment. In addition, it should be noted that the use of magnet 44 and the internal sensing means within handle 32 to activate the autowinding system of autowinder 10 is accomplished while maintaining the integrity of housing 30. Thus each time trigger 45 is depressed, shutter release button 24 is correspondingly pushed causing the film exposure within camera 11 and the autowinding and film advance function is carried forward automatically.

Figure 4:
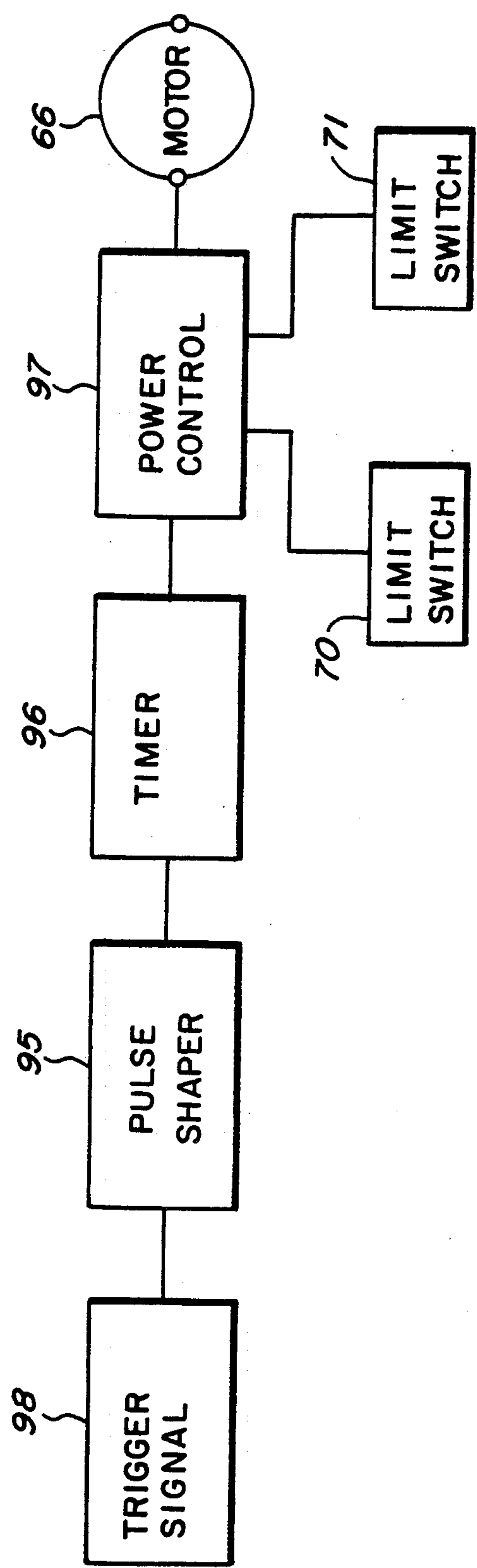
FIG. 4 sets forth a block diagram of the electrical portion of the present invention autowinder.

FIG. 2 sets forth a partially sectioned rear perspective view of the present invention autowinder 10. As set forth above, camera 11 includes a sealed camera body 12 having an upper surface 25, a view finder 20 and a flash plate 22 supported thereon. As is also set forth above, autowinder 10 includes a sealed housing 30 having a generally U-shaped configuration formed by a lower portion 33, a handle portion 32 and an upper portion 31. While not seen in FIG. 2, lower portion 33 is firmly secured to the underside of camera body 12 using the conventional tripod mounting aperture and a conventional threaded fastener. Upper housing 31 further supports a pair of pivots 34 and 35. A generally cylindrical arm 40 extends between pivots 34 and 35 and supports a forwardly extending shutter link arm 41 and a downwardly angled shutter actuator arm 42. A trigger arm 43 is joined to arm 40 in a perpendicular relationship and supports a magnet 44 at its bottom end. A trigger button 45 is supported upon trigger arm 43 and a coil spring 46 is coupled between trigger button 45 and handle 32 to bias trigger arm 43 forwardly. Lower portion 33 of housing 30 supports a plurality of batteries 36 which provide the operating power source for autowinder 10. A control circuit 75 constructed in accordance with the block diagram shown in FIG. 4 is supported within handle 32. Control circuit 75 includes a sensor 76 located proximate to the motion path of magnet 44. A reversible drive motor 66 constructed in accordance with conventional fabrication techniques is supported within handle 32 and terminates in an upwardly extending drive shaft 65. Drive shaft 65 in turn supports a drive gear 64.

In accordance with the present invention, the film advance lever (not shown) which is normally provided with camera 11 and which is normally operated manually by the photographer has been removed from camera 11 to permit the attachment of autowinder 10. Accordingly, the film advance gear which would otherwise support the above-mentioned film advance lever, extends from upper surface 25 of camera body 12. A driven gear 61 is rotatably supported within upper portion 31 of housing 30 in accordance with conventional fabrication techniques and is coupled to film advance gear 60 by a gear coupling 67. It should be noted that the coupling between film advance gear 60 and gear coupling 67 is the sole place at which any mechanism extends between the interior of housing 30 and its exterior. Thus in accordance with conventional fabrication techniques, it should be understood that gear coupling 67 includes appropriate sealing apparatus for permitting the coupling of rotational power between gear 61 and film advance gear 60 while maintaining the seal integrity of housing 30. A drive belt 62 encircles a portion of gear 61 and drive gear 64 and is properly tensioned to transmit rotational power therebetween. A magnet 63 it supported upon drive belt 62 and is movable therewith. A pair of magnetic sensors 70 and 71 are supported within the interior of upper portion 31 of housing 30 by conventional fabrication techniques.

At the outset it should be noted that for purposes of clarity, the electrical interconnections between batteries 36, control circuit 75, motor 66, and sensor 70 and 71 have been omitted to more clearly present the operational configuration of autowinder 10. It should be understood by those skilled in the art, however, that such electrical connections may be provided by conventional wiring fabrication techniques and need not be set forth herein.

In operation, trigger button 45 is depressed with respect to handle 32 causing trigger arm 43 to pivot about pivot 35 in the direction indicated by arrow 52. The pivotal motion of trigger arm 43 in turn causes a rotation of arm 40 in the direction indicated by arrow 54. As a result of the rotation of arm 40, shutter link arm 41 and shutter actuator arm 42 are pivoted in the direction indicated by arrow 53 causing the above-described operation of shutter release 24 (seen in FIG. 1). Simultaneously, the pivotal motion of trigger arm 33 causes magnet 44 to pass close to sensor 66 producing an output signal which is processed by control circuit 75. As is set forth below in FIG. 4, the process of control circuit 75 includes implementing a predetermined delay between the activation of sensor 76 and the operation of motor 66. Once the delay provided by control circuit 75 has been completed, control circuit 75 activates motor 66 to initiate rotation of drive shaft 65 in the direction indicated by arrow 77. The rotation of shaft 65 in the direction indicated by arrow 77 causes a corresponding rotation of drive gear 64 which in turn moves belt 62 in the manner indicated by arrow 78. The motion of belt 62 causes a corresponding rotation of gear 61, gear coupling 67, and film advance gear 60 in the direction indicated by arrow 79. The rotation of film advance gear 60 causes the customary film advance and shutter resetting mechanisms within camera 11 to be operated in accordance with their normal operation. The drive activation of motor 66 continues until magnet 63 activates limit sensor 70 producing a limit signal which is processed by control circuit 75 to reverse the direction of rotation of motor 66. Thereafter, motor 66 is energized to rotate shaft 65 in the direction indicated by arrow 80. The rotation of shaft 65 in the direction of arrow 80 in turn moves drive belt 62 in the direction indicated by arrow 81 causing film advance gear 60 to be rotated in the direction indicated by arrow 82. This opposite direction rotation continues until magnet 63 triggers sensors 71 causing the energizing of motor 66 to be terminated. The rotation of film advance gear 60 in the direction indicated by arrow 82 occuring during the reverse direction operation of motor 66 corresponds to the return stroke of the conventional film advance lever which normally operates film advance gear 60. Thus the autowinding cycle is completed and the next film frame is positioned within the shutter mechanism and the shutter is reset. The cycle repeats each time trigger button 45 is depressed.

FIG. 3 sets forth a partial section veiw of the portion of the present invention autowinder which permits exposure counter window 26 to be viewed directly through upper portion 31 of housing 30. Thus, camera body 12 defines an upper surface 25 which supports an exposure counter window 26. Because upper portion 31, of housing 30 extends above upper surface 25 of camera body 12, direct viewing of exposure counter window 26 is prevented by the attachment of autowinder 10 to camera 11. To accommodate the need to view exposure counter window 26, a light transmissive pipe 90 is positioned in direct alignment with exposure counter window 26 and extends completely through housing 31. A light source 91 provides an illuminating light beam 92 which is directed to exposure counter window 26. The light produced by light source 91 is reflected from exposure counter window 26 upwardly through light pipe 90 in the direction indicated by arrow 93 permitting viewing of window 26. While light source 91 may be continuously operated, it has been found advantageous in the interest of conserving battery power to operate light source 91 solely during a brief portion of the cycle of autowinder 10.

FIG. 4 sets forth a block diagram of control circuit 75 constructed in accordance with the present invention. A power control 97 includes a conventional bidirectional power source coupled to a motor 66. As described above, motor 66 is reversible and responds to power control 97 to operate in either direction of rotation. Limit switch 70 is coupled to power control 97 and is operative upon power control 97 to cause the energizing of motor 66 to be reversed. A limit switch 71 is coupled to power control circuit 97 and is operative thereon to produce an output signal which terminates the energizing of motor 66. A trigger signal source 98 includes sensor 76 and magnet 44 (seen in FIG. 2). Trigger signal source 98 is operative as described above each time magnet 44 is moved close to sensor 76. While any number of magnetic sensors may be used within trigger signal source 98, it has been found advantageous to use a magnetically sensitive reed relay for sensor 76. In any event, trigger signal source 98 produces an output signal each time trigger 45 (seen in FIG. 2) is depressed. The output signal is processed by pulse shaper 95 to produce a more suitable trigger pulse which is thereafter coupled to a delay timer 96. Delay timer 96 produces a time delay between the signal applied from pulse shaper 95 and its transmission to power control circuit 97. Once delay timer 96 has "timed out", the output signal is applied to power control 97 causing the energizing of motor 66. Thus, the circuit shown in FIG. 4 is operated to provide the sequence of operations for motor 66 to carry forward the above-described autowinding functions of autowinder 10. It will be apparent to those skilled in the art that the use of magnetic triggering and magnetic limit switch operation in the present invention system provides a high degree of reliability and facilitates switching systems which are not susceptible to the uncertainties of other sensing switches such as microswitches and the like.

What has been shown is a compact, convenient, easy to use autowinder which is particularly advantageous for use in combination with underwater or all weather cameras.

While particular embodiments of the invention have been shown and described, it will be obvious to those skilled in the art that changes and modifications may be made without departing from the invention in its broader aspects. Therefore the aim in the appended claims is to cover all such changes and modifications as fall within the true spirit and scope of the invention.

That which is claimed is:

1. For use in combination with a camera having a film advance mechanism and shutter release, an autowinder comprising:

a sealed housing having an interior cavity and an exterior;

a trigger arm pivotally coupled to said housing exterior having a first end capable of being positioned proximate the shutter release of the camera and a second end;

a magnet secured to said second end;

a bidirectional motor within said housing;

circuit means within said housing operatively coupled to said motor having first magnetic sensing means responsive to said magnet to initiate energizing of said motor in a first direction;

drive means for coupling said motor to the film advance mechanism of the camera; and limit means cooperating with said circuit means and said drive means to cause operation of the film advance mechanism of the camera through a winding cycle once motor operation is initiated.

2. An autowinder as set forth in claim 1 wherein said circuit means includes a delay timer causing said motor energizing to be delayed to for facilatating film exposure.

3. An autowinder as set forth in claim 2 wherein said drive means includes a drive belt.

4. An autowinder as set forth in claim 3 wherein said film advance mechanism includes a drive pulley and said drive means includes an output pulley driven by said motor and wherein said drive belt is coupled between said drive pulley and said output pulley.

5. An autowinder as set forth in claim 4 wherein said limit means includes first and second magnets secured to said drive belt in a spaced relationship and second magnetic sensing means.

6. An autowinder as set forth in claim 1 wherein said trigger arm defines a generally L-shaped form.

7. An autowinder as set forth in claim 6 wherein said trigger arm is entirely external to said sealed housing.

8. An autowinder as set forth in claim 7 wherein said camera includes an exposure counter indicator and wherein said sealed housing includes a light coupling lens for optical communication with said exposure counter indicator.

9. An autowinder as set forth in claim 8 wherein said housing includes a light source capable of being directed at said exposure counter indicator.

10. An autowinder as set forth in claim 9 wherein said circuit means includes means for energizing said light source for a predetermined interval during each winding cycle.

* * * * *